United States Patent

VanVickle et al.

(10) Patent No.: US 6,633,709 B2
(45) Date of Patent: Oct. 14, 2003

(54) WATER-BLOCKED FIBER OPTIC RIBBON CABLE

(75) Inventors: Patrick S. VanVickle, Raleigh, NC (US); Scott M. Chastain, Holly Springs, NC (US); Stephen R. Stokes, Raleigh, NC (US); Scott Alan McCreary, Cary, NC (US)

(73) Assignee: Sumitomo Electric Lightware Corp., Research Triangle Park, NC (US)

(*) Notice: Subject to any disclaimer, the term of this patent is extended or adjusted under 35 U.S.C. 154(b) by 331 days.

(21) Appl. No.: 09/855,367

(22) Filed: May 15, 2001

(65) Prior Publication Data

US 2003/0026559 A1 Feb. 6, 2003

(51) Int. Cl.[7] ................................................. G02B 6/44
(52) U.S. Cl. ......................................... 385/112; 385/114
(58) Field of Search ................................. 385/112, 114, 385/100, 109

(56) References Cited

U.S. PATENT DOCUMENTS

| | | | |
|---|---|---|---|
| 4,366,206 A | * | 12/1982 | Tanaka ........................ 428/373 |
| 5,157,752 A | | 10/1992 | Greveling et al. |
| 5,388,175 A | | 2/1995 | Clarke |
| 5,422,973 A | | 6/1995 | Ferguson et al. |
| 5,642,452 A | | 6/1997 | Gravely et al. |
| 5,649,041 A | | 7/1997 | Clyburn, III et al. |
| 6,330,385 B1 | * | 12/2001 | Sheu ........................... 385/109 |
| 6,500,541 B1 | * | 12/2002 | Schoeck et al. ............. 428/372 |
| 2002/0041744 A1 | * | 4/2002 | Anelli et al. ................. 385/112 |

* cited by examiner

Primary Examiner—Chandrika Prasad
(74) Attorney, Agent, or Firm—Jenkins, Wilson & Taylor, P.A.

(57) ABSTRACT

A water-tight fiber optic ribbon communications cable constructed without the use of gel or grease in the buffer tube(s) thereof. A plurality of water-blocking yarns are provided around at least a portion of the stack of fiber optic ribbons loosely positioned within the buffer tube(s) that possess water swellable characteristics. The swell capacity of the plurality of water blocking yarns exceeds the critical mass of water that could enter the buffer tube(s) by a factor of 2.0 or more. Optionally, superabsorbent powder can be applied between and/or on the fiber optic ribbon stack.

22 Claims, 2 Drawing Sheets

Single Tube Dry Water Blocked Ribbon Cable

WATER-BLOCKED FIBER OPTIC RIBBON CABLE

TECHNICAL FIELD

The present invention relates to an improved optical fiber communications cable. More particularly, the invention relates to a fiber optic ribbon cable in which water is prevented from longitudinally flowing along the interior of the fiber optic ribbon cable.

RELATED ART

In order to overcome axial water penetration through a buffer tube in a fiber optic cable, it has been the practice in prior cable designs to flood the buffer tubes with a grease or gel in order to fill the interstices of the buffer tube(s) of a fiber optic cable so as to prevent the flow of water along the axis of the cable. Most conventional fiber optic cables for outdoor use that include fiber optic ribbon cables and loose tubes utilize the aforementioned grease or gel flooded buffer tube technology.

As is also well known to those skilled in the fiber optic cable art, the flooding of the buffer tube(s) of a fiber optic cable with grease or gel to prevent axial water penetration through a buffer tube suffers from many shortcomings and drawbacks. The most serious shortcoming is that a craftsman handling the optical fiber communications cable must remove the grease or gel from the buffer tube(s) and clean all of the elements therein before beginning whatever work is necessary for the craftsman to perform. The cleaning process is both time consuming and unpleasant for the craftsman. Also, the grease or gel adds a significant amount of weight to the fiber optic communications cable which results in limiting its potential uses. For these and other reasons, it is desirable to eliminate the need to flood the buffer tube(s) of a fiber optic cable with grease and gel to prevent axial water penetration through the buffer tube(s) of the fiber optic cable.

Also, efforts have been made to deal with the water penetration and water migration problem of fiber optic cable by using superabsorbent compounds which are added to an optical fiber cable in the form of treated yarns, tapes and/or core elements as well as applying thin coatings and powders selectively to the cable construction. U.S. Pat. Nos. 4,703,998; 4,913,517; 5,133,034; and 5,642,452 (assigned to the assignee of the present invention) are representative patents relating to the use of superabsorbent compounds in optical fiber cable constructions to impart water blocking capabilities to the optical fiber cables. However, the prior efforts to utilize superabsorbent compounds have not all proven to be highly effective at a modest cost for reasons that are well known to those skilled in the fiber optic cable art.

The present invention is believed to overcome the foregoing problems of the prior art by providing for a novel fiber optic ribbon cable construction as described herein.

DISCLOSURE OF THE INVENTION

In accordance with the present invention, applicants provide a water-blocked optical fiber loose tube cable possessing enhanced performance characteristics. The cable comprises a plurality of stacked fiber optic ribbons having a plurality of water blocking yarns extending generally along the length of the stack of fiber optic ribbons and positioned around at least a portion of the circumference of the stack wherein the plurality of water blocking yarns possess water swellable characteristics. The stack of fiber optic ribbons and the plurality of water blocking yarns extending along the length of the stack of fiber optic ribbons are all loosely disposed in a buffer tube having an interior channel larger than the stack of fiber optic ribbons. The swell capacity ($M_{capacity}$) of the plurality of water blocking yarns should exceed the critical mass of water ($M_{critical}$) that could enter the buffer tube by a factor of 2.0 or more wherein the swell capacity is determined by the formula:

$$M_{capacity} = (N)(d)(B)$$

wherein

N=number of water blocking yarns d=yarn denier

B=absorbency and the critical mass of water is determined by the formula:

$$M_{critical} = (A_{tubeopen})(P_{water})$$

wherein $A_{tubeopen}$=open area of buffer tube $P_{water}$=density of water

Optionally, a suberabsorbent powder may also be applied between and/or on the stack of fiber optic ribbons loosely disposed in the buffer tube of the optical fiber loose tube cable.

It is therefore an object of the present invention to provide an improved water-blocked optical fiber communications cable.

It is another object of the present invention to provide an improved water-blocked fiber optic ribbon cable wherein cable weight is significantly reduced vis-à-vis grease or gel cable construction so as to enhance installation of the cable by a craftsman and allow installation of longer cable lengths.

It is another object of the present invention to provide an improved water-blocked fiber optic ribbon cable that can be used for outside plant data communications and telecommunications applications without using grease or gel filling compounds within the buffer tube(s).

Some of the objects of the invention having been stated hereinabove, other objects will become evident as the description proceeds, when taken in connection with the accompanying drawing as best described hereinbelow.

BEST MODE FOR CARRYING OUT THE INVENTION

Figure 1:
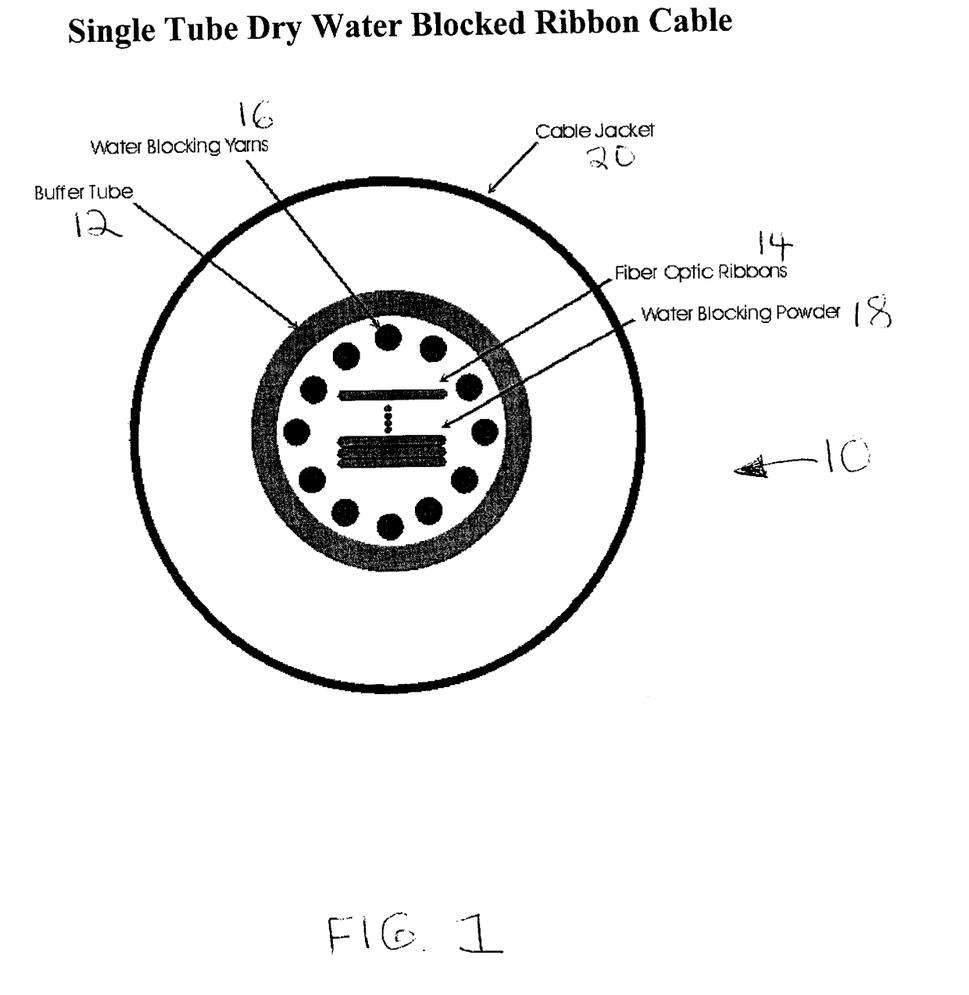
FIG. 1 shows a vertical cross-sectional view of a preferred single buffer tube embodiment of the cable of the present invention.

Referring now to FIG. 1, there is shown therein a water-blocked fiber optic ribbon cable constructed in accordance with the preferred embodiment of the present invention and generally designated 10. Cable 10 is a water-blocked fiber optic ribbon cable which includes a buffer tube 12 which extends along the longitudinal axis of cable 10 and is most suitably formed of a plastic such as polyoelefin or engineered thermoplastic. Fiber optic ribbons 14 comprising one or more optical fibers each are stacked one on top of the other to form a stack of fiber optic ribbons 14 which are loosely positioned in buffer tube 12. Water blocking yarns 16 are provided within buffer tube 12 and extend generally along the length of the stack of fiber optic ribbons 14, and water blocking yarns 16 possess water swellable characteristics as will be explained in more detail below. Water blocking yarns 16 may be positioned around at least a portion but preferably the entire circumference of the stack of fiber optic ribbons 14, and water blocking yarns 16 may extend generally lengthwise along the length of the stack of fiber optic ribbons 14 or helically along and around the length of the stack of fiber optic ribbons 14.

Water blocking yarns 16 are preferably a blended yarn of poly(acrylamide) and polyester staple fibers yarns although other yarns that incorporate induced dipoles such as those based on poly(acrylic acid) may be used in cable 10. Further, as will be explained in more detail hereinafter, water blocking yarns 16 are characterized by a swell capacity that exceeds the critical mass of water that could enter cable 10 by a factor of at least 2.0 and preferably about 4.0. Optionally, a superabsorbent powder 18 may also be applied between and/or on the stack of fiber optic ribbons 14. The superabsorbent powder is most suitably stabilized poly(acrylic acid) although other superabsorbent powders may be used and are contemplated as being within the scope of the present invention.

Still referring to FIG. 1, it should be understood that water blocking yarns 16 are most suitably manufactured from or treated with superabsorbent compounds such as PAA (polyacrylic acid) so as to be water swellable when water comes into contact therewith. Superabsorbent yarns may completely consist of spun PAA or a suitable PAA may be applied to a staple yarn. Although PAA is the preferred superabsorbent compound in the preferred embodiment of the invention, the invention contemplates that other superabsorbent material can be used to treat water blocking yarns 16 such as polyacrylamide, blends of polyacrylic acid and polyacrylamide, salts of polyacrylic acid and polyacrylamide, and copolymers of polyacrylic acid and polyacrylamide. Finally, a cable jacket 20 is provided around buffer tube 12 in a conventional manner that would be well known to one skilled in the art.

Although cable 10 is shown for illustrative purposes in FIG. 1 as comprising four (4) fiber optic ribbons 14 that each comprise twelve (12) optical fibers and twelve (12) water blocking yarns 16 surrounding fiber optic ribbons 14 within buffer tube 12 that is in turn surrounded by cable jacket 20, applicants contemplate that cable 10 may comprise from one (1) to forty-eight (48) fiber optic ribbons 14 containing from one (1) to forty-eight (48) optical fibers in each of the ribbons, and from one (1) to twenty-four (24) water blocking yarns 16 within buffer tube 12. Further, cable 10 can be formed either with or without water blocking powder 18. If water blocking powder 18 is used, it can be applied between and/or on the stack of fiber optic ribbons 14 loosely positioned in buffer tube 12.

Figure 2:
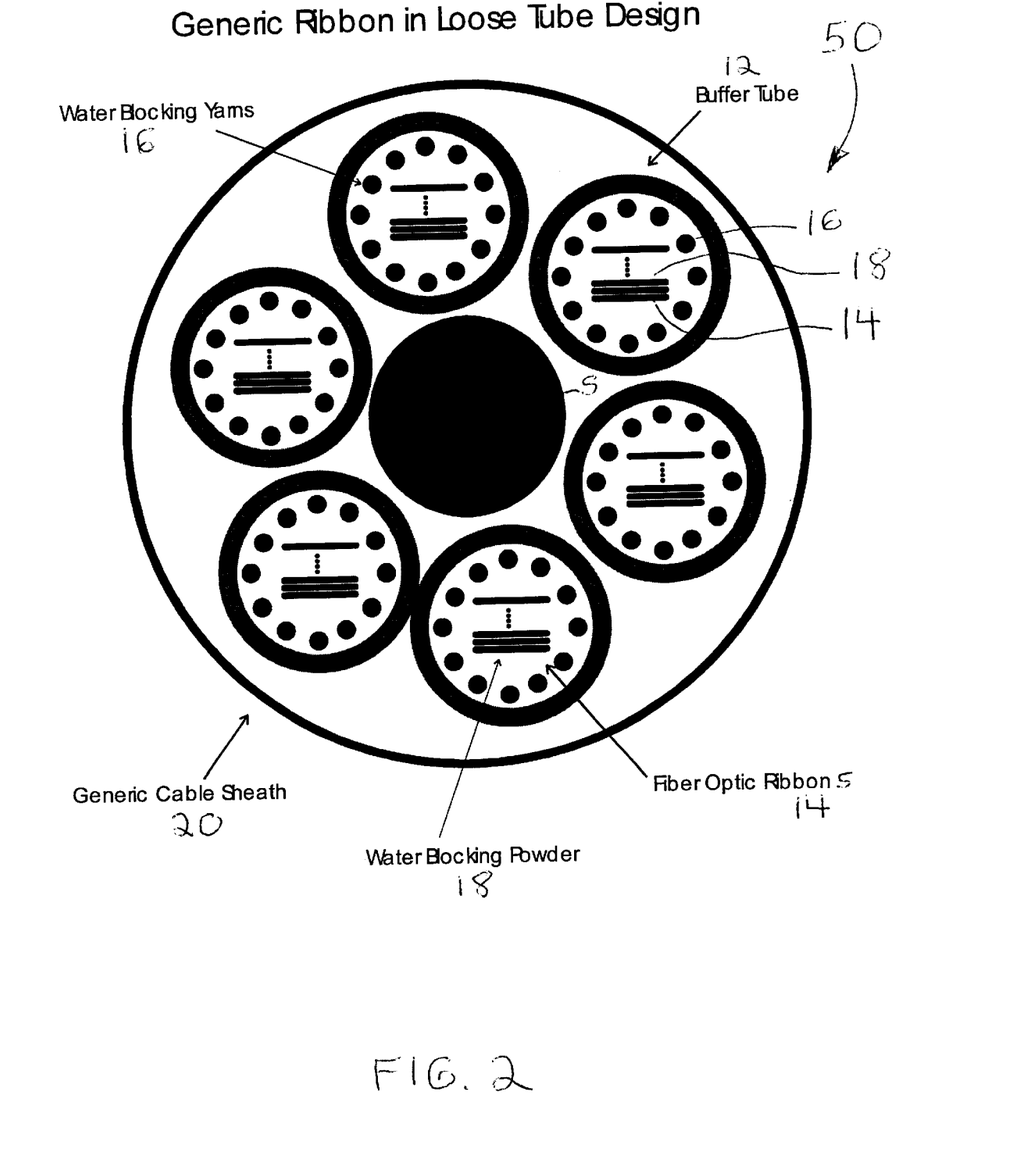
FIG. 2 shows a vertical-cross sectional view of a preferred multiple buffer tube embodiment of the cable of the present invention.

Although FIG. 1 illustrates cable 10 comprising a single tube 12 therein, it should be understood and appreciated that cable 10 may include two or more tubes 12 therein as a matter of design choice as illustrated in FIG. 2. The multiple buffer tube cable shown in FIG. 2 in generally designated 50 and is contemplated as being within the scope of the present invention as defined by the claims appended hereto. Cable 50 as a matter of design choice may include strength member S and up to twenty-four (24) tubes 12 therein.
Ratio of Swell Capacity of Water Blocking Yarns to Critical Mass of Water To satisfy the water penetration requirements for fiber optic ribbon cable 10 at least one and optionally two technologies may be employed. The first and most important is water blocking yarns 16. These yarns will swell and increase their size greatly upon contact with water. The second (and optional) technology is water blocking superabsorbent powder 18. Powder 18 swells a great deal and is easy to apply to areas that are typically difficult to reach.

To determine the placement and amount of water swellable yarns 16 to be used in cable 10 the theoretical calculations set forth below were performed followed by testing to validate the calculations.

1. Theoretical Solution

To determine the required amount of water blocking material it is first necessary to determine the open area of the tube that water may migrate through with the following equation:

$$A_{tube_{open}} = \frac{\pi D_{tube}^2}{4} - A_{ribbon} - A_{yarns} - A_{powder}$$

For a given length of tube 12 there then remains a determinable mass of water than must be blocked or absorbed in order to maintain the integrity of cable 10. This mass may be determined by multiplying the open area of tube 12 by the density of water and is expressed in mass per unit length in the following equation:

$$M_{critical} = (A_{tube_{open}})(P_{water})$$

For each water blocking element in cable 10 it is necessary to determine its swell capacity, or when exposed to water how much mass it will absorb. For water blocking yarns 16 this absorbency number is given as a function of the yarn Denier and expressed as swell mass per yarn mass. Thus, for a given number of yarns N, of Denier d, and absorbency B the total capacity of water absorption expressed in mass per unit length is given by the equation:

$$M_{capacity} = (N)(d)(B)$$

Therefore to maintain integrity of cable 10 and block water penetration in tube 12 with yarns 16 the following equation must be satisfied:

$$M_{capacity} > M_{critical}$$

In most cases it is important that the swell capacity of yarns 16 exceeds the critical mass of water by a factor of 2.0 or more. This is to ensure that an open tube 12 exposed to a 1.0 meter head of water will not allow water to migrate through a 1.0 meter tube in 24 hours as required by a number of cable industry standards. It is also important to note that while the swell rate is exceptionally quick, the swell speed and capacity of water blocking compounds of yarns 16 will degrade when being processed and after exposure to temperature and humidity extremes in operational environments and may necessitate an additional safety factor.

In fiber optic ribbon cables 10 it is necessary to ensure that water does not migrate between fiber optic ribbons 14. In most applications with small fiber optic ribbon stacks the water will be absorbed by the gel formed by water blocking yarns 16, but it remains an optional safety precaution to add water blocking powder 18 to the fiber optic ribbon stack. In addition to impeding water migration in the fiber optic ribbon stack, this also adds an additional safety factor to the overall water blocking ability of tube 12. Water blocking powder 18 also aids in the bending properties of cable 10, allowing the fiber optic ribbons to move more freely in buffer tube 12.

2. Experimental Testing Data

Repeatedly solving the earlier stated equations for a 6.5 mm inner diameter tube 12 containing four (4) twelve (12) optical fiber ribbons 14 yielded a solution with twelve (12) 2000 denier 1.0 mm water blocking yarns 16 and optional water blocking powder 18. While powder 18 has a significant water blocking capacity (300 g/g plus) it was not included in the calculations since the preferred embodiment of cable 10 includes only yarns 16 and not powder 18. Instead the primary function of powder 18 was left to block water migration down the fiber optic ribbon stack and thus to provide additional water blocking safety factor for tube 12.

Substituting these numbers gives:

$$D_{tube} = 6.5 \text{ mm}$$

$$A_{ribbon} = (4)(0.30 \text{ mm})(3.05 \text{ mm})$$

$$A_{yarns} = (12)\frac{\pi(1.00 \text{ mm})^2}{4}$$

$$A_{powder} \approx 0$$

With, $$A_{tube_{open}} = \frac{\pi(6.5 \text{ mm})^2}{4} - 3.66 \text{ mm}^2 - 9.42 \text{ mm}^2 = 20.10 \text{ mm}^2$$

This gives $$M_{critical} = (20.10 \text{ mm}^2)(1000 \text{ kg}/m^3) = 20.10 \text{ g}/m$$

Now calculating the absorption capacity $$M_{capacity} = (12)(2000d)(30 \text{ g/g}) = 80 \text{ g}/m$$

This gives a safety factor of $$M_{safety} = \frac{M_{capacity}}{M_{critical}} = 3.98$$

These results were verified with experiments on tube samples. The results are set forth in Table 1 below wherein the water amounts indicated were absorbed by yarns 16 assisted by optional superabsorbent powder 18.

TABLE 1

| Sample | Water Ingress |
|---|---|
| 1 | 542 mm |
| 2 | 548 mm |

It will be understood that various details of the invention may be changed without departing from the scope of the invention. Furthermore, the foregoing description is for the purpose of illustration only, and not for the purpose of limitation—the invention being defined by the claims.

What is claimed is:

1. An optical fiber loose tube cable, comprising:
   (a) a plurality of stacked fiber optic ribbons or subunits;
   (b) a plurality of water blocking yarns extending generally along the length of said stack of fiber optic ribbons and positioned around at least a portion of the circumference of said stack of fiber optic ribbons, said plurality of water blocking yarns possessing water swellable characteristics;
   (c) a buffer tube having an interior channel larger than said stack of fiber optic ribbons, with said stack of fiber optic ribbons and said plurality of water blocking yarns loosely disposed in said buffer tube;
   (d) wherein the swell capacity ($M_{capacity}$) of said plurality of water blocking yarns exceeds the critical mass of water ($M_{critical}$) that could enter said buffer tube by a factor of 2.0 or more, said swell capacity being determined by the formula:

$$M_{capacity} = (N)(d)(B)$$

wherein
N=number of water blocking yarns
d=yarn denier
B=absorbency and said critical mass of water being determined by the formula:

$$M_{critical} = (A_{tubeopen})(\rho_{water})$$

wherein
$A_{tubeopen}$=open area of buffer tube
$\rho_{water}$=density of water.

2. The optical fiber loose tube cable according to claim 1, wherein said plurality of water blocking yarns are positioned around substantially the entire circumference of said stack of fiber optic ribbons.

3. The optical fiber loose tube cable according to claim 2, wherein said plurality of water blocking yarns extend longitudinally along the length of said stack of fiber optic ribbons.

4. The optical fiber loose tube cable according to claim 2, wherein said plurality of water blocking yarns extend helically along the length of said stack of fiber optic ribbons.

5. The optical fiber loose tube cable according to claim 1, wherein said plurality of water blocking yarns comprises a plurality of twenty-four (24) or less yarns.

6. The optical fiber loose tube cable according to claim 1, wherein the swell capacity ($M_{capacity}$) of said plurality of water blocking yarns exceeds the critical mass of water ($M_{critical}$) by a factor of about 4.0.

7. The optical fiber loose tube cable according to claim 1, including a superabsorbent powder applied between and/or on said stack of fiber optic ribbons.

8. The optical fiber loose tube cable according to claim 7, wherein said superabsorbent powder is a suitably stabilized poly(acrylic acid).

9. The optical fiber loose tube cable according to claim 1, comprising a jacket around said buffer tube.

10. The optical fiber loose tube cable according to claim 1, wherein said cable comprises: a stack of four (4) fiber optic ribbons; and twelve (12) water blocking yarns.

11. The optical fiber loose tube cable according to claim 1, comprising a plurality of said buffer tubes within said jacket.

12. An optical fiber loose tube cable, comprising:
   (a) a plurality of stacked fiber optic ribbons, said stack of fiber optic ribbons having a superabsorbent powder applied between and/or on said stack of fiber optic ribbons;
   (b) a plurality of water blocking yarns extending generally along the length of said stack of fiber optic ribbons and positioned around at least a portion of the circumference of said stack of fiber optic ribbons, said plurality of water blocking yarns possessing water swellable characteristics;
   (c) a buffer tube having an interior channel larger than said stack of fiber optic ribbons, with said stack of fiber optic ribbons and said plurality of water blocking yarns loosely disposed in said buffer tube;

(d) wherein the swell capacity (M capacity) of said plurality of water blocking yarns exceeds the critical mass of water (M critical) that could enter said buffer tube by a factor of 2.0 or more, said swell capacity being determined by the formula:

$$M_{capacity}=(N)(d)(B)$$

wherein
N=number of water blocking yarns
d=yarn denier
B=absorbency
and said critical mass of water being determined by the formula:

$$M_{critical}=(A_{tubeopen})(\rho_{water})$$

wherein
$A_{tubeopen}$=open area of buffer tube
$\rho_{water}$=density of water.

13. The optical fiber loose tube cable according to claim 12, wherein said plurality of water blocking yarns are positioned around substantially the entire circumference of said stack of fiber optic ribbons.

14. The optical fiber loose tube cable according to claim 13, wherein said plurality of water blocking yarns extend longitudinally along the length of said stack of fiber optic ribbons.

15. The optical fiber loose tube cable according to claim 13, wherein said plurality of water blocking yarns extend helically along the length of said stack of fiber optic ribbons.

16. The optical fiber loose tube cable according to claim 12, wherein said plurality of water blocking yarns comprises a plurality of twenty four (24) yarns.

17. The optical fiber loose tube cable according to claim 12, wherein the swell capacity ($M_{capacity}$) of said plurality of water blocking yarns exceeds the critical mass of water ($M_{critical}$) by a factor of about 4.0.

18. The optical fiber loose tube cable according to claim 12, wherein said superabsorbent powder is suitably stabilized poly(acrylic acid).

19. The optical fiber loose tube cable according to claim 12, comprising a jacket around said buffer tube.

20. The optical fiber loose tube cable according to claim 12, wherein said cable comprises: a stack of four (4) fiber optic ribbons; and twelve (12) water blocking yarns.

21. The optical fiber loose tube cable according to claim 19, comprising a plurality of said buffer tubes within said jacket.

22. The optical fiber cable of claim 21, wherein said plurality of buffer tubes comprises twenty-four (24) or less buffer tubes.

* * * * *

UNITED STATES PATENT AND TRADEMARK OFFICE
CERTIFICATE OF CORRECTION

PATENT NO. : 6,633,709 B2
DATED : October 14, 2003
INVENTOR(S) : Van Vickie, et al.

It is certified that error appears in the above-identified patent and that said Letters Patent is hereby corrected as shown below:

<u>Title page,</u>
Should be deleted and substitute therefor the attached title page.
Item [73], Assignee, should read -- Sumitomo Electric Lightwave Corp. --

<u>Drawings,</u>
Delete Figures 1-2, and substitute therefor the following pages consisting of Figures 1-2 on the attached pages.

Signed and Sealed this

Thirty-first Day of August, 2004

JON W. DUDAS
*Director of the United States Patent and Trademark Office*

(12) United States Patent
VanVickle et al.

(10) Patent No.: US 6,633,709 B2
(45) Date of Patent: Oct. 14, 2003

(54) WATER-BLOCKED FIBER OPTIC RIBBON CABLE (75) Inventors: Patrick S. VanVickle, Raleigh, NC (US); Scott M. Chastain, Holly Springs, NC (US); Stephen R. Stokes, Raleigh, NC (US); Scott Alan McCreary, Cary, NC (US)

(73) Assignee: Sumitomo Electric Lightware Corp., Research Triangle Park, NC (US)

(*) Notice: Subject to any disclaimer, the term of this patent is extended or adjusted under 35 U.S.C. 154(b) by 331 days.

(21) Appl. No.: 09/855,367

(22) Filed: May 15, 2001

(65) Prior Publication Data
US 2003/0026559 A1 Feb. 6, 2003

(51) Int. Cl.$^7$ ................................................ G02B 6/44
(52) U.S. Cl. ........................................ 385/112; 385/114
(58) Field of Search ................................ 385/112, 114, 385/100, 109

(56) References Cited

U.S. PATENT DOCUMENTS

| | | | |
|---|---|---|---|
| 4,366,206 A | * | 12/1982 | Tanaka ........................ 428/373 |
| 5,157,752 A | | 10/1992 | Greveling et al. |
| 5,388,175 A | | 2/1995 | Clarke |
| 5,422,973 A | | 6/1995 | Ferguson et al. |
| 5,642,452 A | | 6/1997 | Gravely et al. |
| 5,649,041 A | | 7/1997 | Clyburn, III et al. |
| 6,330,385 B1 | * | 12/2001 | Sheu ........................... 385/109 |
| 6,500,541 B1 | * | 12/2002 | Schoeck et al. ............. 428/372 |
| 2002/0041744 A1 | * | 4/2002 | Anelli et al. ................. 385/112 |

* cited by examiner

*Primary Examiner*—Chandrika Prasad
(74) *Attorney, Agent, or Firm*—Jenkins, Wilson & Taylor, P.A.

(57) ABSTRACT

A water-tight fiber optic ribbon communications cable constructed without the use of gel or grease in the buffer tube(s) thereof. A plurality of water-blocking yarns are provided around at least a portion of the stack of fiber optic ribbons loosely positioned within the buffer tube(s) that possess water swellable characteristics. The swell capacity of the plurality of water blocking yarns exceeds the critical mass of water that could enter the buffer tube(s) by a factor of 2.0 or more. Optionally, superabsorbent powder can be applied between and/or on the fiber optic ribbon stack.

22 Claims, 2 Drawing Sheets

FIG. 1

FIG. 2